US009224993B2

(12) United States Patent
Hamaya et al.

(10) Patent No.: US 9,224,993 B2
(45) Date of Patent: Dec. 29, 2015

(54) BATTERY PACK ENCASING STRUCTURE AND WALKING ASSISTANCE DEVICE USING SAME

(75) Inventors: Kazushi Hamaya, Wako (JP); Masaya Nakano, Moriguchi (JP)

(73) Assignee: HONDA MOTOR CO., LTD., Tokyo (JP)

(*) Notice: Subject to any disclaimer, the term of this patent is extended or adjusted under 35 U.S.C. 154(b) by 685 days.

(21) Appl. No.: 13/488,898

(22) Filed: Jun. 5, 2012

(65) Prior Publication Data

US 2012/0316477 A1    Dec. 13, 2012

(30) Foreign Application Priority Data

Jun. 10, 2011    (JP) ................................ 2011-129953
Sep. 8, 2011    (JP) ................................ 2011-196461

(51) Int. Cl.
*H01M 2/10*        (2006.01)
*A61H 1/02*        (2006.01)
*A61H 3/00*        (2006.01)

(52) U.S. Cl.
CPC ........... *H01M 2/1005* (2013.01); *A61H 1/0244* (2013.01); *A61H 3/00* (2013.01); *H01M 2/10* (2013.01); *H01M 2/1066* (2013.01); *H01M 2/1094* (2013.01); *A61H 2201/1215* (2013.01); *A61H 2201/163* (2013.01); *A61H 2201/165* (2013.01); *A61H 2201/1642* (2013.01); *A61H 2201/5069* (2013.01)

(58) Field of Classification Search
CPC .................... A61H 2205/10; A61H 2205/108; A61H 2205/106; A61H 2203/0406; A61H 2203/04; A61H 3/00; A61H 1/0244; A61H 2201/5069; A61H 2201/163; A61H 2201/1642; A61H 2201/165; A61H 2201/1215; H01M 2/1005; H01M 2/1006; H01M 2/1011; H01M 2/1016; H01M 2/1022

USPC ............ 601/5, 23, 33, 34, 35; 429/96, 97, 98, 429/99, 100

See application file for complete search history.

(56) References Cited

U.S. PATENT DOCUMENTS

| 5,251,105 | A | * | 10/1993 | Kobayashi et al. ...... 361/679.58 |
| 5,749,838 | A | * | 5/1998 | Kline ............................... 601/71 |
| 5,841,630 | A | * | 11/1998 | Seto et al. ................ 361/679.58 |
| 5,905,632 | A | * | 5/1999 | Seto et al. ................ 361/679.55 |
| 6,261,715 | B1 | * | 7/2001 | Nakamura et al. ............ 429/100 |

(Continued)

FOREIGN PATENT DOCUMENTS

| JP | 2001-135289 | 5/2001 |
| JP | 2002-170537 | 6/2002 |

*Primary Examiner* — Justine Yu
*Assistant Examiner* — Tu Vo
(74) *Attorney, Agent, or Firm* — Rankin, Hill & Clark LLP

(57) ABSTRACT

A connector provided in a lower middle part of a battery pack, is protected from moisture in a reliable manner while simplifying the installing and removing of the battery pack. A vertical wall of the battery pack is formed with an arch-shaped ridge having a higher middle part and a pair of lower lateral end parts. A battery pack receiving recess is provided with a vertical wall opposing the vertical wall of the battery pack, and a pair of through holes on either lower end thereof. The vertical wall of the battery pack receiving recess is formed with an arch-shaped groove configured to receive the arch-shaped ridge of the battery pack. Moisture that may be deposited on the vertical wall surfaces is trapped by a water channel defined by the groove and the ridge, and drained from the battery pack receiving recess via the through holes.

6 Claims, 11 Drawing Sheets

(56) References Cited

U.S. PATENT DOCUMENTS

| | | | |
|---|---|---|---|
| 6,537,694 B1* | 3/2003 | Sugiura et al. | 429/120 |
| 7,278,979 B2* | 10/2007 | Shimada et al. | 602/16 |
| 7,857,774 B2* | 12/2010 | Sankai | 601/5 |
| 7,998,096 B1* | 8/2011 | Skoog | 601/5 |
| 8,343,643 B2* | 1/2013 | Miller et al. | 429/71 |
| 8,409,119 B2* | 4/2013 | Shimizu et al. | 601/35 |
| 2004/0001997 A1* | 1/2004 | Zatezalo et al. | 429/96 |
| 2004/0158175 A1* | 8/2004 | Ikeuchi et al. | 601/5 |
| 2006/0211956 A1* | 9/2006 | Sankai | 601/5 |
| 2006/0276728 A1* | 12/2006 | Ashihara et al. | 601/5 |
| 2007/0027409 A1* | 2/2007 | Katoh et al. | 601/5 |
| 2009/0306554 A1* | 12/2009 | Yasuie | 601/5 |
| 2010/0234777 A1* | 9/2010 | Yasuhara et al. | 601/35 |

* cited by examiner

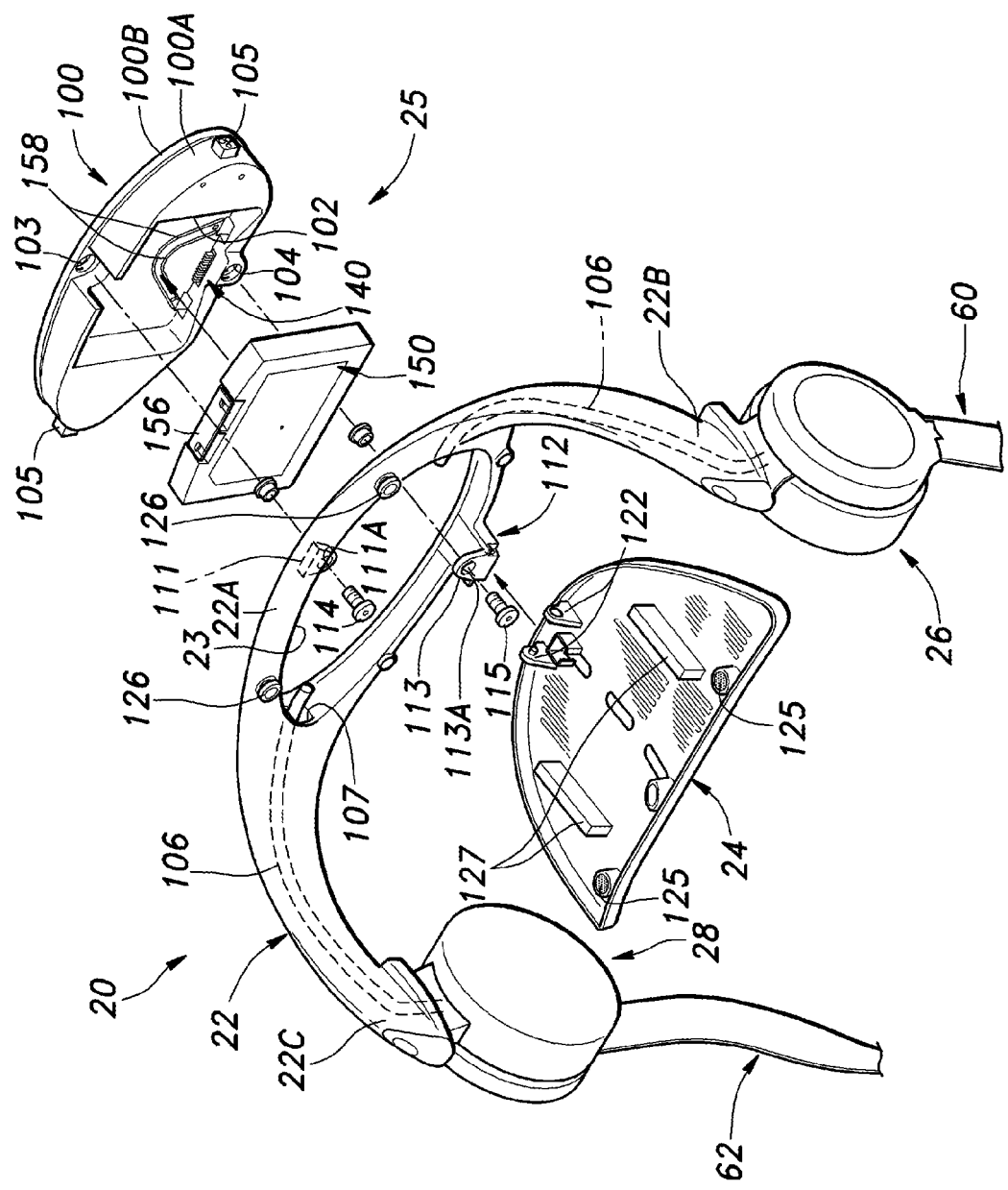
Fig.2
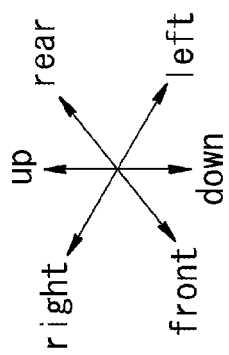

BATTERY PACK ENCASING STRUCTURE AND WALKING ASSISTANCE DEVICE USING SAME

TECHNICAL FIELD

The present invention relates to a battery pack encasing structure and a walking assistance device using the same, and in particular to a technology for protecting a battery pack received in a device such as a walking assistance device from the elements while ensuring a favorable handling of the battery pack.

BACKGROUND OF THE INVENTION

The battery pack for an electric or electronic device that may be used outdoors is required to be protected from the elements, in particular moisture. JP 2001-135289A discloses such a waterproof structure.

The battery pack can be protected from moisture by receiving it in a waterproof enclosure, but it requires a large number of components and increases the size of the device in which the battery pack is incorporated, particularly when a reliable waterproofing is intended.

However, the battery pack consisting of rechargeable batteries such as lithium ion batteries is fully enclosed and highly water-tight by itself, and the parts thereof that require protection are limited to the electric connector thereof. Even when moisture finds its way into a receptacle for the battery pack, no problem arises as long as the electric connector or the contacts thereof are not exposed to the moisture.

BRIEF SUMMARY OF THE INVENTION

Based on a such a recognition by the inventors and with the aim of providing a solution to the problems associated with conventional structures for receiving battery packs, a primary object of the present invention is to provide a battery pack encasing structure that is protected from moisture in a reliable manner without complicating the handling thereof.

A second object of the present invention is to provide a battery pack encasing structure that protects the battery pack in a reliable manner without requiring an expensive and/or complex structure.

A third object of the present invention is to provide a battery pack encasing structure that can protect the battery pack in a reliable manner while simplifying the installing and removing of the battery pack into and out of the battery pack encasing structure.

A fourth object of the present invention is to provide a walking assistance device incorporated with such a battery pack encasing structure.

According to the present invention, such objects can be accomplished by providing a battery pack encasing structure, including a battery pack having a second part of an electric connector provided in a prescribed part thereof and a main frame defining a battery pack receiving recess configured to receive the battery pack therein and having a first part of the electric connector in a corresponding part thereof, characterized by that: a ridge or groove having an incline is formed on one of a pair of mutually opposing vertical wall surfaces of the battery pack and the battery pack receiving recess of the main frame, and a drain hole is provided in a lower part of the battery pack receiving recess laterally offset from the electric connector and under a lower terminal end of the ridge or groove.

Any moisture or droplets thereof that may be deposited on the vertical wall surface is guided by the ridge or groove to the drain hole, and is prevented from reaching the electric connector. Therefore, even when the battery pack receiving recess is not sealed or is otherwise placed in a readily accessible condition for easy replacement of the battery pack, the electric connector is favorably protected from the intrusion of moisture.

For optimum trapping of moisture and guiding of the moisture to the drain hole, one of the mutually opposing vertical wall surfaces of the battery pack and the battery pack receiving recess of the main frame may be formed with a groove having an incline while the other is formed with a ridge fitting into the groove.

According to a preferred embodiment of the present invention, the electric connector is located in a laterally middle part of the mutually opposing vertical wall surfaces, and the ridge and groove are given with an arch shape including an elevated laterally middle part and a pair of lower lateral end parts, a pair of drain holes being provided in lower part of the battery pack receiving recess located under the lower lateral end parts of the ridge or groove.

According to a particularly preferred embodiment of the present invention, a pair of projections are provided in parts of a lower end wall of the battery pack, the projections being configured to be received in the drain holes without entirely closing the drain holes when the battery pack is received in the battery pack receiving recess.

The engagement between each projection with the corresponding drain hole enables the battery pack to be held in the battery pack receiving recess in a stable manner without impairing the moisture draining function of the drain holes. Also, the engagement between each projection with the corresponding drain hole allows the battery pack to be installed and removed into and from the battery pack receiving recess in a favorable manner by performing the function of a hinge.

Preferably, the battery pack receiving recess includes a bottom end defined by the vertical wall surface and an open end opposite from the bottom end, and the main frame further includes a cover plate that selectively closes the battery pack receiving recess.

Thereby, the battery pack can be held in position in a reliable manner without substantially reducing the accessibility to the battery pack. Preferably, the cover plate may be provided with a latch that detachably hold the cover plate in the closed condition.

According to an embodiment of the present invention, at least a part of a periphery of a wall surface of the battery pack adjacent to the open end of the battery pack receiving recess when the battery pack is received in the battery pack receiving recess is provided with a lateral flange, and a part of the main frame defining the open end of the battery pack receiving recess includes a recess configured to receive the lateral flange of the battery pack.

By thus receiving the lateral flange in the recess both extending along the peripheral edge of the open end of the battery pack receiving recess, the channel communicating the interior of the battery pack receiving recess with the outside is defined by a highly tortuous one so that the intrusion of moisture into the battery pack receiving recess can be minimized.

This battery pack encasing structure can be favorably applied to various vehicles for transporting people and/or cargo and devices worn by a person. For instance, the battery pack encasing structure of the present invention can be applied to a walking assistance device, comprising: a pelvic frame having an intermediate portion configured to be applied to a lower back of a user and a pair of front portions extending laterally outward and forward from the intermediate portion; an abdominal belt detachably securing the pelvic frame on a pelvic part of the user; a power generator attached to each front portion of the pelvic frame at a position corresponding to a hip joint of the user; and a femoral support member having a base end connected to an output end of each power generator and a free end engaging a femoral pat of the user; wherein the battery pack encasing structure is incorporated on a front side of the intermediate portion of the pelvic frame.

BRIEF DESCRIPTION OF THE DRAWINGS

Now the present invention is described in the following with reference to the appended drawings, in which:

FIG. 2 is an exploded perspective view of a main part of the walking assistance device;

DETAILED DESCRIPTION OF THE PREFERRED EMBODIMENTS

An embodiment of a walking assistance device incorporated with a battery pack receiving structure according to the present invention is described in the following with reference to FIGS. 1 and 2. In the following description, the directions of the walking assistance device will be generally based on the orientation as illustrated, and the fore and aft direction corresponds to the sagittal axis of the user while the lateral direction corresponds to the coronal axis of the user.

Figure 1:
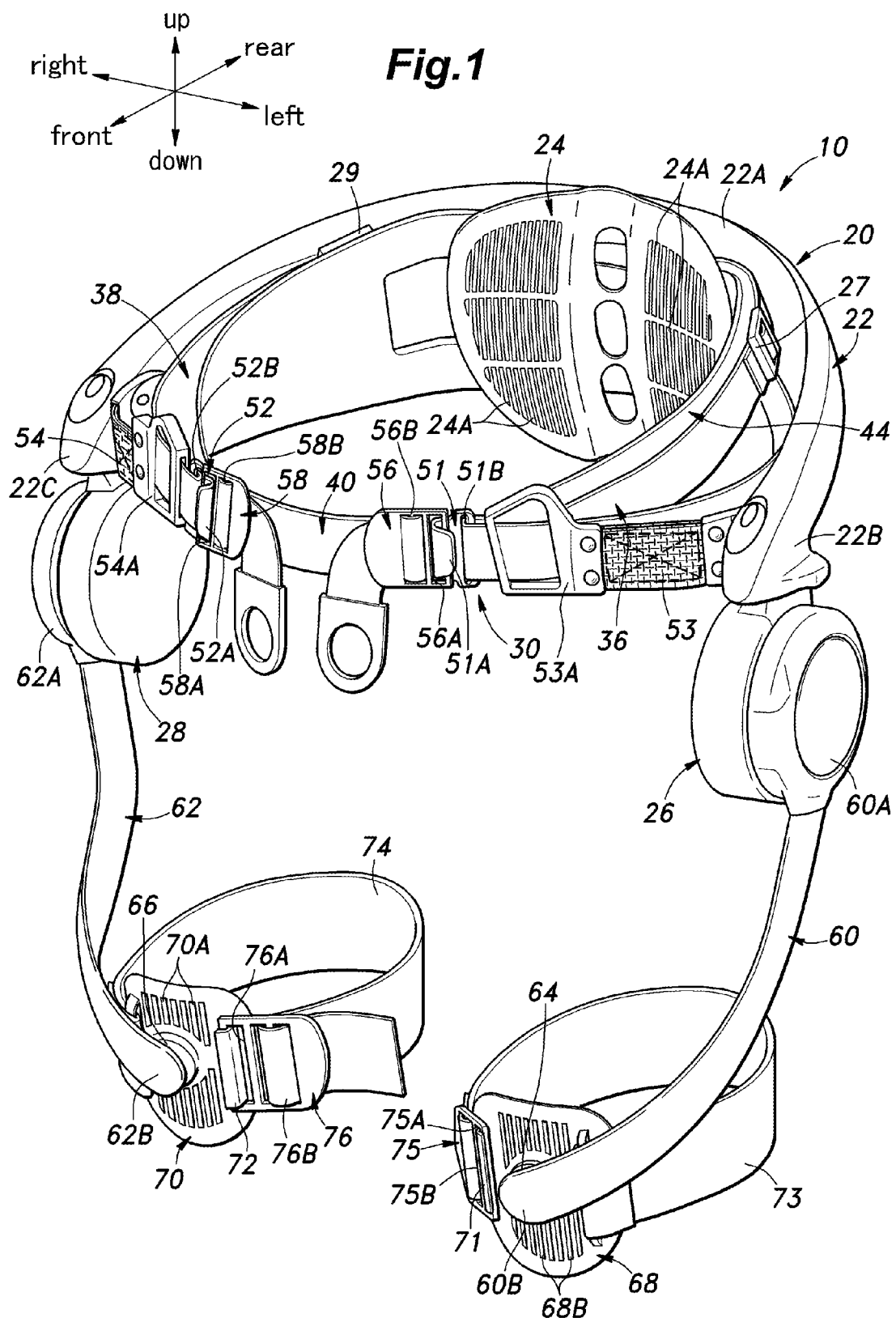
FIG. 1 is a perspective view of a walking assistance device to which a battery pack encasing structure according to the present invention is applied.

Referring to FIG. 1, the walking assistance device 10 according to the present invention comprises a pelvic support assembly 20 which is configured to be worn on a pelvic part of the user, and the pelvic support assembly 20 includes a pelvic frame (main frame) 22 having a substantially rigid structure. The pelvic frame 22 is generally C-shaped as seen in plan view, and includes an intermediate portion 22A configured to be applied to a lower back of the user and a pair of front portions 22B and 22C extending in a laterally outward and forward direction along an arcuate profile of either side of the hip or the pelvic part of the user. The pelvic frame 22 may consist of a hollow molded plastic member made of a high stiffness and high mechanical strength material such as glass fiber or carbon fiber reinforced plastic.

An opening 23 is passed through the intermediate portion 22A of the pelvic frame 22 in the fore and aft direction, and an electric unit 25 incorporated with a control unit and a battery pack is received in this opening 23 as will be described hereinafter. A back support plate 24 is provided on the side of the intermediate portion 22A of the pelvic frame 22 facing the user, and closes the inner end of the opening 23. The back support plate 24 is provided with a plurality of vertical slits 24A arranged laterally at a regular interval so as to acquire air breathability and flexibility.

An abdominal belt 30 configured to be wrapped around the abdominal part of the user extends along the inner side of the pelvic frame 22. In the illustrated embodiment, the abdominal belt 30 includes a left side belt part 36, a right side belt part 38 and a front belt part 40. These belt parts 36, 38 and 40 may be made of flexible material such as fabric, leather and plastic.

One end of the left side belt part 36 is attached to an upper part of a left hand side of the intermediate portion 22A of the pelvic frame 22. The left side belt part 36 is passed through a slot 51B of a hook member 51, and is folded back to the intermediate portion 22A of the pelvic frame 22. The other end of the left side belt part 36 is attached to a lower part of the left hand side of the intermediate portion 22A of the pelvic frame 22. A buckle 27 is provided in an intermediate part of the left side belt part 36 to allow the length of the left side belt part 36 to be adjusted. The right side belt part 38 is similarly attached to the intermediate portion 22A of the pelvic frame 22, and passed through a slot 52B of a hook member 52. A buckle 29 is provided in an intermediate part of the right side belt part 38 to allow the length of the right side belt part 38 to be adjusted.

Each hook member 51, 52 has a width slightly greater than the width of the corresponding side belt part, and may be made of plastic or metallic material. Each hook member 51, 52 is provided with a hook 51A, 52A.

Each end of the front belt part 40 is fitted with a ladder shaped engagement member 56, 58. Each engagement member 56, 58 is provided with an opening 56A, 58A for engaging the corresponding hook 51A, 52A, and a bar 56B, 58B around which the corresponding end part of the front belt part 40 is passed so that the corresponding end part of the front belt part 40 is engaged by the engagement member 56, 58, and the length of the front belt part 40 may be adjusted. Each free end of the front belt part 40 is provided with a pull ring to facilitate the pulling of each free end of the front belt portion 40.

A stabilizer member 53, 54 is attached to the inner side of each front portion 22B, 22C at a base end thereof. The free end of each stabilizer member 53, 54 is provided with a belt holder 53 A, 54A defining a slot through which the corresponding side belt part 36, 38 is passed.

Each stabilizer member 53, 54 demonstrates a relatively high stiffness against a vertical bending deformation, and a relatively low stiffness against a lateral bending deformation (caused by the movement of the stabilizer member toward and away from the user). Therefore, the stabilizer members 53 and 54 freely permit the fastening and unfastening of the abdominal belt 30 toward and away from the user's abdominal part while preventing the drooping of the side belt parts 36 and 38 or retaining the hook members 51 and 52 at a prescribed height even when the abdominal belt 30 is unfastened.

The front portions 22B and 22C of the pelvic frame 22 are located on either side of the pelvic part of the user when the pelvic frame 22 is worn by the user. A motor unit 26, 28 is connected to a lower end of each front portion 22B, 22C via a hinge having a hinge axis extending in the fore and aft direction although not shown in the drawings. Therefore, each motor unit 26, 28 is enabled to rotate around the sagittal axis (in the direction of spreading the leg) while being rigidly attached to the pelvic frame 22 in other respects. Each motor unit 26, 28 is incorporated with an electric motor and an angular sensor such as a rotary encoder for detecting the angular position of an output member of the electric motor.

The pelvic support assembly 20 further comprises a left supporter piece 44 and a right supporter piece 46. Each supporter piece 44, 46 is made of relatively stiff sheet member having a vertical width greater than the combined width of the two runs of the corresponding side belt part 36, 38 extending along the outer surface of the supporter piece 44, 46. Each supporter piece 44, 46 has a base end located between the back support plate 24 and corresponding side belt part 36, 38, and is jointly secured to the pelvic frame 22, and extends along the inner surface of the side belt part 36, 38. To impart a suitable stiffness to each supporter piece 44, 46, a resilient plastic or metallic wire may be incorporated in the supporter piece 44, 46, for instance, along the outer periphery thereof.

Thus, the supporter pieces 44 and 46 are flexible enough to conform to the contour of the pelvic part of the user but stiff enough to distribute the pressure from the left and right side belt parts 36 and 38 over a large area of the body of the user so that the comfort of the user may be enhanced. Also, in order to increase the air breathability, and ensure adequate comfort to the user in a warm weather, the supporter pieces 44 and 46 may be at least partly made of a mesh type fabric or other air permeable material.

The base end of the left supporter piece 44 is secured to the intermediate portion 22A of the pelvic frame 22, and extends between the back support plate 24 and left side belt 36 as mentioned earlier. The free end of the left supporter piece 44 terminates at a point adjacent to the left hook member 51 in the illustrated embodiment, but may also extend slightly beyond the left hook member 51.

Similarly, the base end of the right supporter piece 46 is secured to the intermediate portion 22A of the pelvic frame 22, and extends between the back support plate 24 and right side belt part 38. The free end of the right supporter piece 46 terminates at a point adjacent to the right hook member 52 in the illustrated embodiment, but may also extend slightly beyond the left hook member 52. The right supporter piece 46 extends along the side of the user in a similar fashion as the left supporter piece 44.

A base end 60A, 62A of a swing arm 60, 62 can be detachably attached to each electric motor unit 26, 28 so that the output torque of the electric motor unit 26, 28 is converted into a fore and aft swinging movement of the swing arm 60, 62. The swing arm 60, 62 consists of an elongated plate member generally extending downward from the base end thereof adjacent to the hip joint of the user along a side of the femoral part of the user, and slightly twisted toward the lower end thereof so that the free end 60B, 62B thereof is located in front of the femoral part of the user. Each swing arm 60, 62 may be made of a highly stiff but light material such as aluminum or other alloy, glass fiber or carbon fiber reinforced plastic material, A front femoral support plate 68, 70 is attached to the free end 60B, 62B of each swing arm 60, 62 via a spherical joint 64, 66. The front femoral support plate 68, 70 is made of a plastic plate member and curved so as to conform to the front face of the femoral part of the user, and is provided with a plurality of vertical slots 68A, 70A arranged laterally at a regular interval so as to acquire a breathability and a flexibility.

The laterally inner end of the front face of each front femoral support plate 68, 70 is integrally formed with a hook 71, 72. The laterally outer end of the front face of each front femoral support plate 68, 70 is provided with a loop engaging a base end of a femoral belt 73, 74, and the free end of the femoral belt 73, 74 is fitted with a ladder shaped engagement member 75, 76 including a vertical bar 75B, 76B around which the free end of the femoral belt 73, 74 is passed so that the free end part of the femoral belt 73, 74 may be engaged and the effective length of the femoral belt 73, 74 may be adjusted, and a rectangular opening 75A, 76A configured to detachably engage the corresponding hook 71, 72. Thus, each femoral belt 73, 74 can be passed around the femoral part of the user in cooperation with the corresponding femoral support plate 68, 70 in a detachable and adjustable manner.

As described above, the walking assistance device 10 can be worn by the user by retaining the pelvic frame 22 on the pelvic part of the user with the abdominal belt 30, and securing the free end 60B, 62B of the swing arm 60, 62 on the front face of the femoral part of the user by using the front femoral support plate 68, 70 and the femoral belt 73, 74. As the user wearing the walking assistance device 10 moves the user's legs back and forth with an intent to walk, the electric motor units 26 and 28 provide a walking assistance force via the swing arms 60 and 62 that perform a back and forth swinging movement around the base ends 60A and 62A thereof.

In particular, the angular movements of the swing arms 60, 62 are detected by the angular sensors, and a control unit 160 which will be described hereinafter controls the electric motor units 26 and 28 such that the swing arms 60 and 62 are actuated in response to the walking movement of the user, and a walking assistance force is applied to the femoral parts of the user.

The electric unit 25 and the battery pack receiving structure incorporated in the electric unit 25 are described in the following with reference to FIGS. 2 to 9.

As shown in FIG. 2, the electric unit 25 comprises a unit casing 100 which is fitted in the substantially elliptic opening 23 passed through the intermediate portion 22A of the pelvic frame 22. As shown in FIGS. 2, 4, 5 and 7, the unit casing 100 consists of a case main body 100A located on the front side and a cover 100B located on the rear side. The case main body 100A is provided with a certain depth (in the fore and aft direction) to internally define a space for accommodating electric components and a battery pack as will be described hereinafter, and in provided with an outer profile conforming to the elliptic opening 23. The cover 100B is fixedly secured to the rear end of the case main body 100A.

Figure 7:
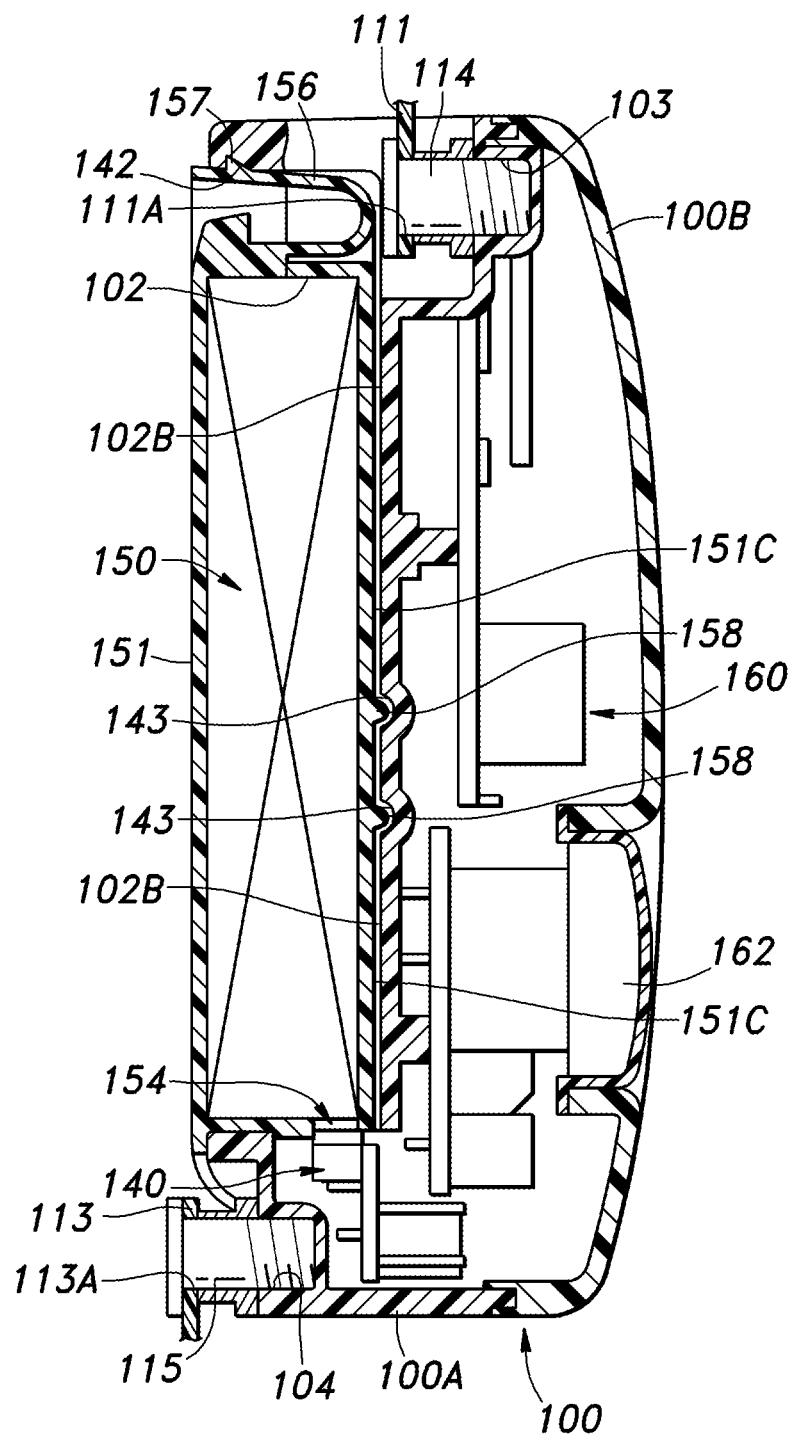
FIG. 7 is a sectional view taken along line VII-VII of FIG. 6.

As best shown in FIG. 7, the case main body 100A is provided with a pair of bolt holes 103 and 104 located in upper and lower laterally middle parts thereof, respectively. The intermediate portion 22A of the pelvic frame 22 is provided with an upper securing piece 111 and a lower securing piece 113 at positions corresponding to the bolt holes 103 and 104 of the case main body 100A. The unit casing 100 can be received in the receiving opening 23, and fixedly secured therein by passing a first bolt 114 through a through hole 111A formed in the upper securing piece 111 to be threaded into the upper bolt hole 103, and by passing a second bolt 115 through a through hole 113A formed in the lower securing piece 113 to be threaded into the lower bolt hole 104.

The electric unit 25 is incorporated with a control unit 160 (FIG. 7) including a microcomputer. In particular, the control unit 160 is received in a space defined between the cover 100B and an opposing wall of the case main body 100A. The control unit 160 receives a supply of electric power from a battery pack 150 incorporated in the electric unit 25, and controls the electric motor units 26 and 28. The cover 100B is provided with a pushbutton 162 that can be accessed from the rear. See FIGS. 5 and 7. As shown in FIG. 2, a cable 106 leading to each electric motor unit 26 and 28 is passed inside the hollow interior 107 of the corresponding front portion 22B, 22C of the pelvic frame 22, and is passed into the unit casing 100 or into the electric unit 25. A rubber grommet 105 is attached to each side part of the unit casing 100 where the corresponding cable 106 is passed into the unit casing 100. The cables 106 electrically connect the electric units 25 and the electric motor units 26 and 28 for conducting electric power and electric signals.

Figure 4:
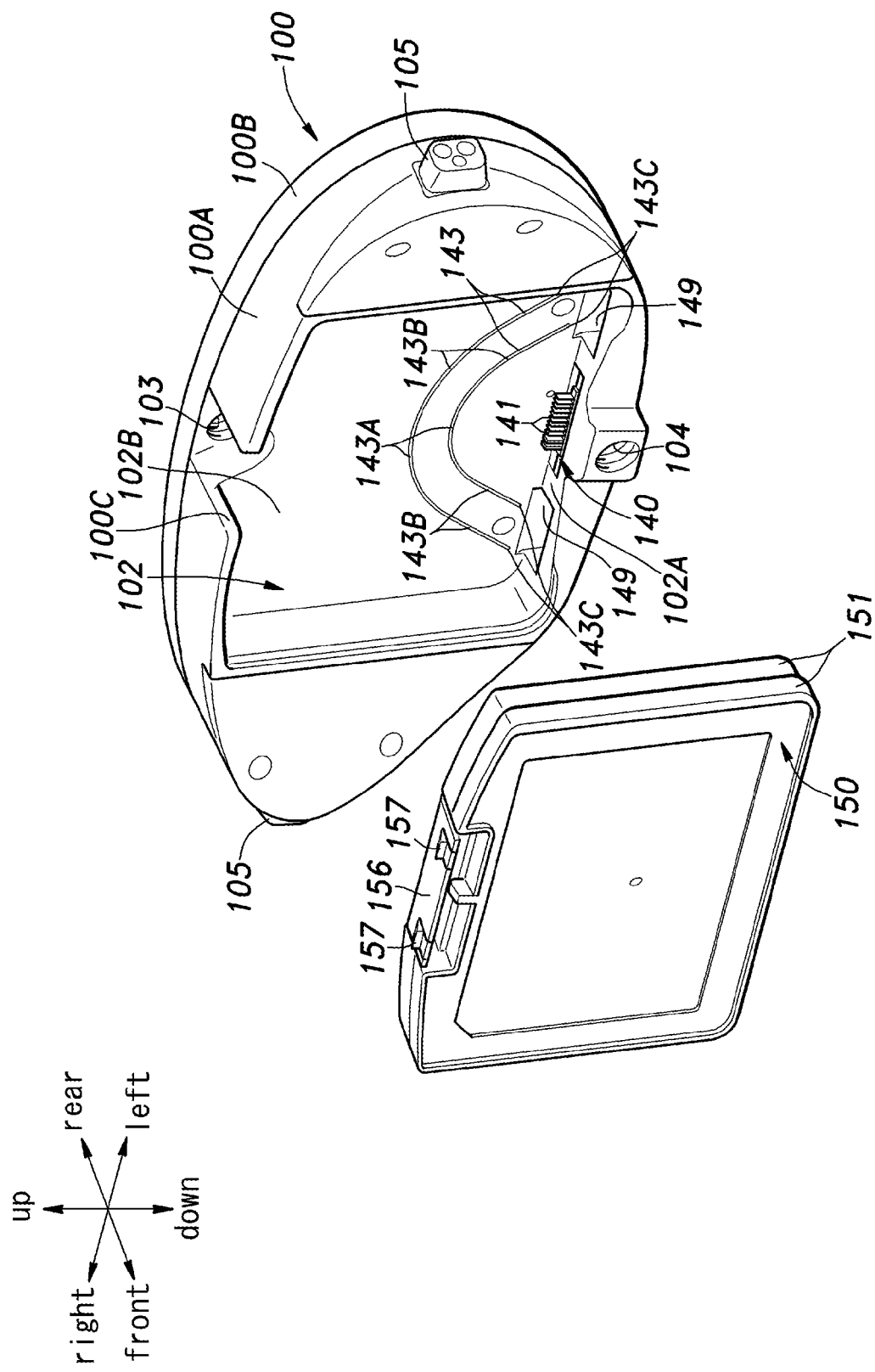
FIG. 4 is an exploded front perspective view of the battery pack encasing structure.

As shown in FIG. 4, the front face of the case main body 100A is formed with a battery pack receiving recess 102 for detachably receiving the battery pack 150 which consists of a rectangular box shaped unit. The battery pack receiving recess 102 is dimensioned and configured to snugly receive the battery pack 150 therein. An electric connector (first part of a connector) 140 protrudes into the battery pack receiving recess 102 from a laterally middle part of a lower wall thereof. The electric connector 140 is provided with a plurality of terminals 153 connected to the control unit 160. A pair of vertical through holes (drain holes) 149 are passed through the lower wall on either lateral side of the electric connector 140. These through holes 149 may serve as drain holes if any moisture should be trapped in the battery recess 102, and ventilation holes that prevent condensation of moisture in the battery pack receiving recess 102. The bottom wall 102B of the battery pack receiving recess 102 (which defines the space for accommodating the control unit 160 in cooperation with the cover 100B of the unit casing 100) is provided with a pair of parallel grooves 143 each having a semi-circular cross section on the side thereof facing the battery pack receiving recess 102. These grooves 143 extend from one lower corner of the battery pack receiving recess 102 to the other along an arched path. In particular, the two ends of each of the grooves 143 are located immediately above the corresponding through holes 149. In other words, the grooves 143 extend in parallel to each other, and each include an elevated laterally middle part 143A and a pair of lower lateral end parts 143B whose terminal ends 143C are located immediately above the through holes 149. These grooves 143 conduct moisture that may accumulate on the bottom wall 102B to the through holes 149.

Figure 5:
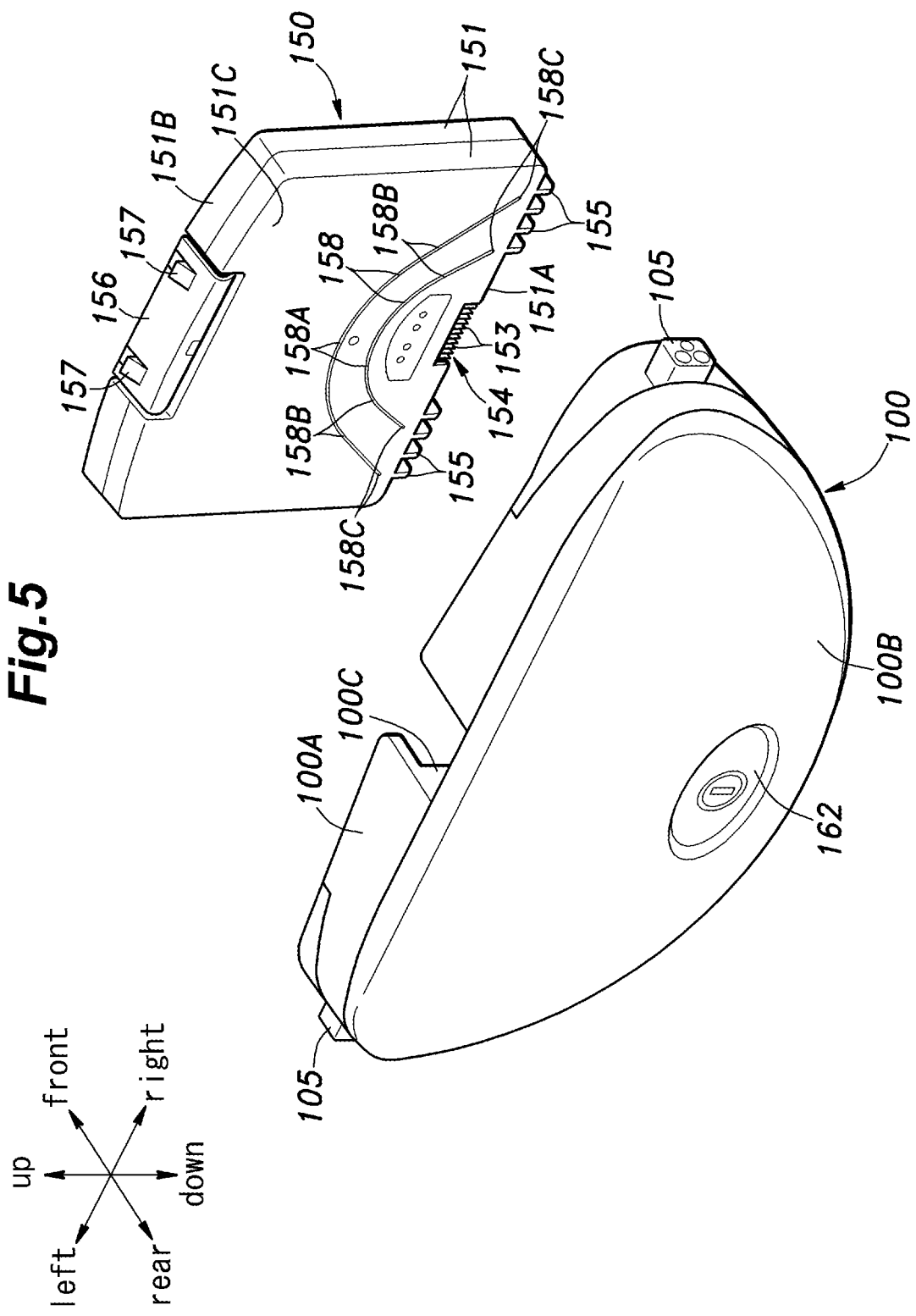
FIG. 5 is an exploded rear perspective view of the battery pack encasing structure.
Figure 6:
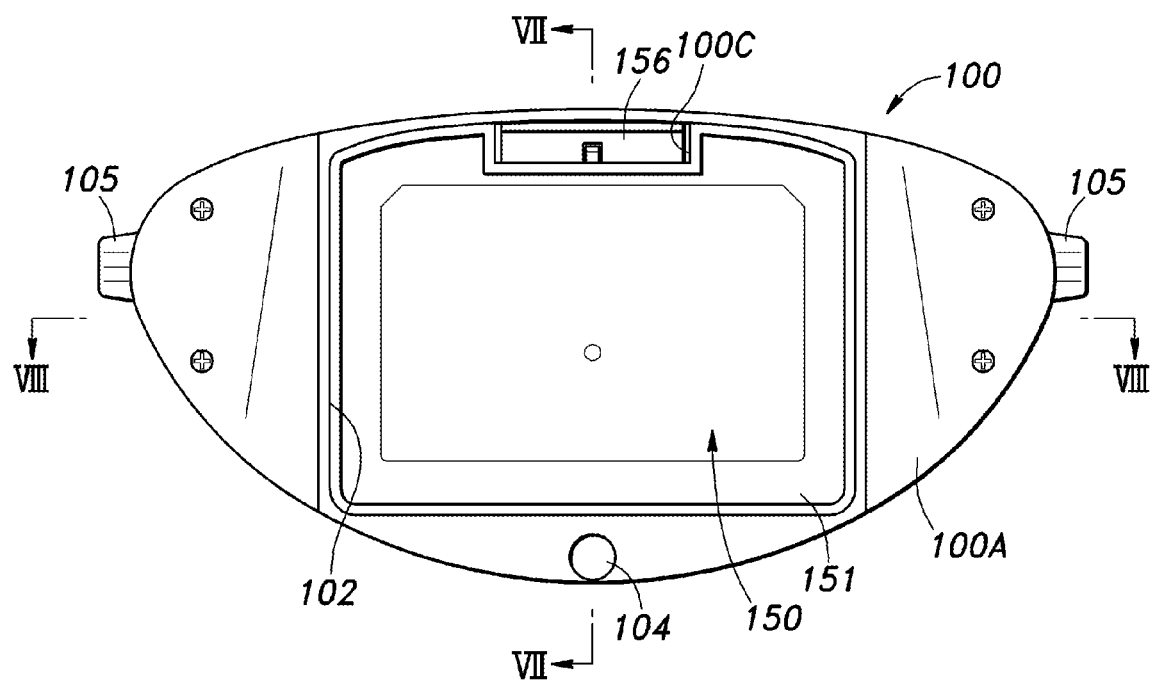
FIG. 6 is a front view of the battery pack encasing structure.

The battery pack 150 includes a water-proof (or drip-proof), plastic enclosure 151 that receives a plurality of rechargeable battery cells such as lithium ion battery cells. As shown in FIG. 5, the enclosure 151 is provided with an electric connector (second part of the connector) 154 including a plurality of battery terminals 153 in a middle part of the lower end 151A thereof for establishing an electric connection with the electric unit 25 via the corresponding connector 140 of the battery pack receiving recess 102.

From each lateral end of the lower end 151A of the enclosure 151 project a projection 155 consisting of a plurality of ribs that fits into the corresponding through hole 149 without entirely closing the through hole 149.

The upper end 151B of the enclosure 151 is integrally provided with a resilient piece 156 having a U-shaped vertical cross section and provided with a pair of engagement claws 157 on the upper surface thereof so that when the battery pack 150 is received in the battery pack receiving recess 102, the engagement claws 157 are resiliently engaged by corresponding engagement recesses 142 (FIG. 7) formed in the upper wall surface of the battery pack receiving recess 102, and securely retain the battery pack 150 in the battery pack receiving recess 102.

The rear wall 151C of the enclosure 151 is provided with a pair of arcuate ridges 158 each having a semicircular cross section and complementary to the corresponding grooves 143 (FIGS. 5 and 7) on the bottom wall 102B of the battery pack receiving recess 102. Therefore, when the battery pack 150 is retained within the battery pack receiving recess 102 as described above, the arcuate ridges 158 closely fit into the corresponding grooves 143. The arcuate ridges 158 are provided on the vertical rear wall 151C of the enclosure 151, and include a laterally middle part 158A located at an elevated part thereof and a pair of laterally outer parts 158B slanting downward toward the outer terminal ends thereof. The outer terminal ends 158C of the laterally outer parts 158B of the arcuate ridges 158 terminate at positions corresponding to the through holes 149 similarly as the corresponding grooves 143 of the vertical bottom wall 102 B of the battery pack receiving recess 102. Because the arcuate ridges 158 extend laterally across the rear wall 151C of the enclosure 151, and are given with this arch shape, the electric connector 154 which is located under these arcuate ridges 158 is protected from moisture that may have intruded into the gap between the rear wall 151C of the enclosure 151 and the opposing vertical bottom wall 102B of the battery pack receiving recess 102 is prevented from reaching or contaminating the electric connector 154. The rear wall 151C of the enclosure 151 is substantially vertical in the illustrated embodiment when the walking assistance device 10 is in use, but the "vertical" as used for the rear wall 151C should be interpreted as being upright or not horizontal to the extent that moisture that may deposit on the rear wall 151C tends to flow towards the side of the battery pack 150 where the connector 154 is located under the gravitational force. The same is true with the verticality of the bottom wall 102B of the battery pack receiving recess 102.

The battery pack 150 may be installed in the unit casing 100 by placing the lower end of the battery pack 150 into the battery pack receiving recess 102 so as to fit the projections 155 of the batter pack 150 into the through holes 149, and tilting the battery pack 150 into the upright posture with the lower end of the battery pack 150 acting as a hinge. As a result, the entire battery pack 150 is fully received in the battery pack receiving recess 102, and is held in this position owing to the engagement of the engagement claws 157 with the engagement recesses 142 under the resilient force of the resilient piece 156 and the engagement of the projections 155 with the through holes 149.

This establishes an electric connection between the electric connector 140 of the electric unit 25 and the electric connector 154 of the battery pack 150. Even though the through holes 149 receive the projections 155 in this condition, an adequate gap for permitting moisture to be drained is defined between the through holes 149 and the projections 155.

When the battery pack 150 is to be removed, the resilient piece 156 is depressed downward via an opening 100C formed in the upper part of the case main body 100A to disengage the engagement claws 157 from the engagement recesses 142. The upper end of the battery pack 150 is then pulled out of the battery pack receiving recess 102, and the projections 155 are pulled out from the through holes 149. As a result, the battery pack 150 is entirely removed from the battery pack receiving recess 102.

As shown in FIG. 2, the back support plate 24 is connected to the pelvic frame 22 via a hinge 121 at a lower end thereof so as to be moveable between a closed position closing the battery pack receiving recess 102 and concealing the front side of the unit casing 100, and an open position exposing the front side of the unit casing 100 and opening the battery pack receiving recess 102.

The back side of the back support plate 24 is provided with a pair of ribs 127 extending vertically (FIG. 2) that abut the front surface of the battery pack 150 when the battery pack 150 is received in the battery pack receiving recess 102 and the back support plate 24 is closed. Thereby, the battery pack 150 can be firmly retained in the battery pack receiving recess 102.

Figure 3:
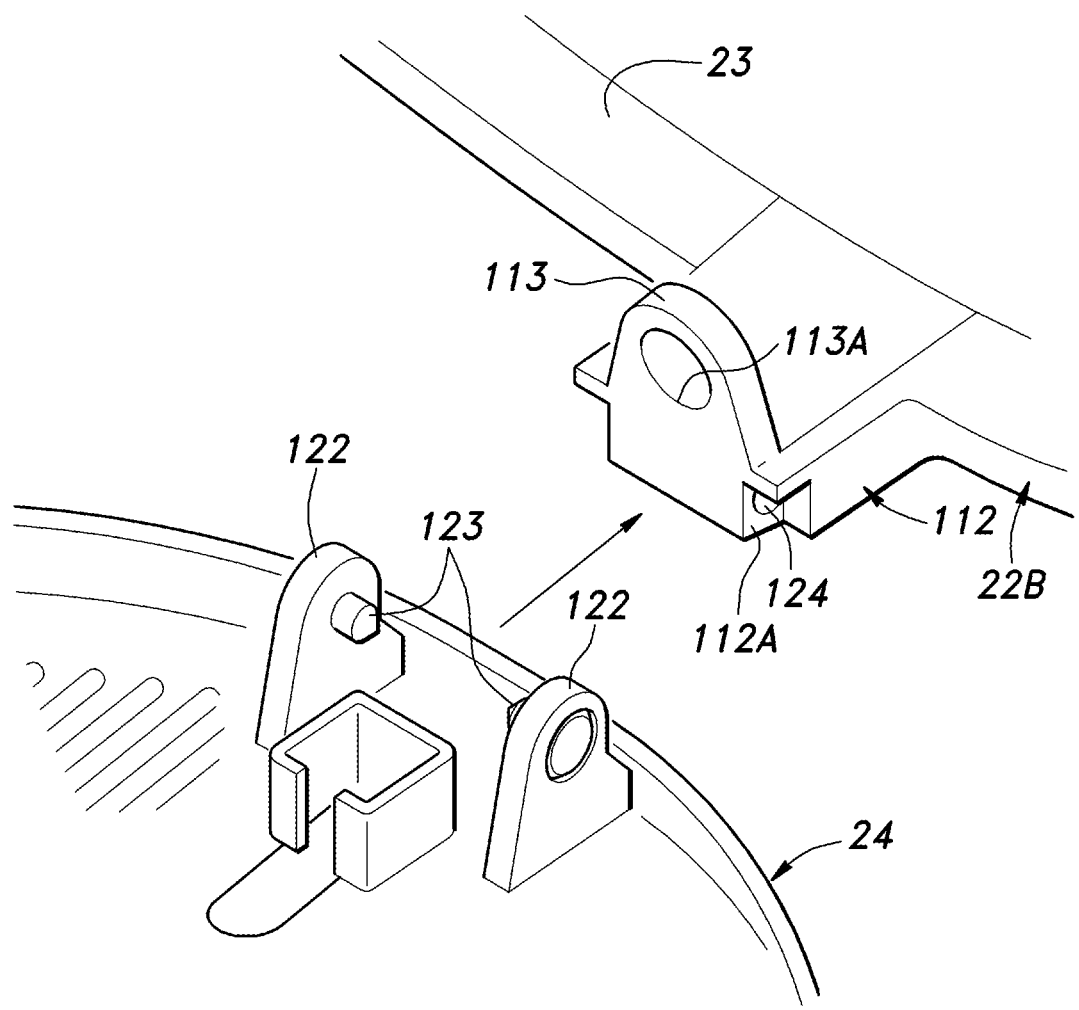
FIG. 3 is an enlarged fragmentary perspective view of a back support plate hinged to a pelvic frame of the walking assistance device.

As shown in FIG. 3, the hinge 121 includes a pair of resilient engagement pieces 122 extending rearward from a lower part of the back support plate 24 in a mutually spaced apart relationship, a pair of pins 123 integrally formed on the opposing faces of the resilient engagement pieces 122 in a coaxial relationship and a support piece 112 extending forward centrally from a lower part of the intermediate portion 22A of the pelvic frame 22 and provided with a pair of circular recesses 124 on the mutually facing away sides thereof in a coaxial relationship. The resilient engagement pieces 122 can be resiliently bent away from each other so that the pins 123 may be fitted into the corresponding circular recesses 124. The lateral sides 112A of the support piece 112 are slightly tapered so as to facilitate the fitting of the pins 123 into the corresponding circular recesses 124. Thereby, the back support plate 24 can be opened and closed as required.

As shown in FIG. 2, a pair of permanent magnets 125 are affixed to upper lateral end parts of the inner face of the back support plate 24, and a pair of rivets 126 made of steel or other iron material are secured to the corresponding positions of the front face of the intermediate portion 22A of the pelvic frame 22. These rivets 126 are used for securing the base ends of the abdominal belt. When the back support plate 24 is closed, these permanent magnets 125 are attracted to the corresponding rivets 126, and firmly hold the back support plate 24 in the closed position. If desired, any latch mechanism may be used, instead of the combination of the permanent magnets 125 and the rivets 126.

The back support plate 24 covers the front side of the battery pack receiving recess 102, but does not provide protection from the intrusion of moisture into the battery pack receiving recess 102. However, the intrusion of moisture into the essential part of the battery pack receiving recess 102 is avoided as discussed in the following. If any moisture is deposited on the front face of the battery pack 150, the moisture drips downwards, and does not reach the electric connectors 140 and 154. If any moisture is deposed on either side face of the battery pack 150 or the back side of the battery pack 150, the moisture drips downwards, and drained out of the battery pack receiving recess 102 via the through holes 134. Therefore, the moisture is prevented from reaching the electric connectors 140 and 154.

The moisture that may have intruded into the gap between the bottom wall 102B of the battery pack receiving recess 102 and the rear face of the battery pack 150 is trapped in the water channels defined by the grooves 143 and ridges 158. As the water channels are arched downward on either lateral end part thereof, the trapped moisture is guided to either lateral end part of the battery pack receiving recess 102, and then to the through holes 134 to be drained out of the battery pack receiving recess 102. Therefore, the electric connectors 140 and 154 are positively protected from the intrusion of moisture.

The back support plate 24 can be easily opened and closed so that the battery pack 150 can be installed and removed with ease. This prevents the back support plate 24 to be constructed as a water-tight structure for the battery pack receiving recess 102. However, the electric connectors 140 and 154 are positively protected from the intrusion of moisture. Therefore, the structure described above achieves both the convenience of installing and removing the battery pack 150 and the favorable protection of the battery pack 150 from the adverse effects that could be caused by the intrusion of moisture.

Figure 8:
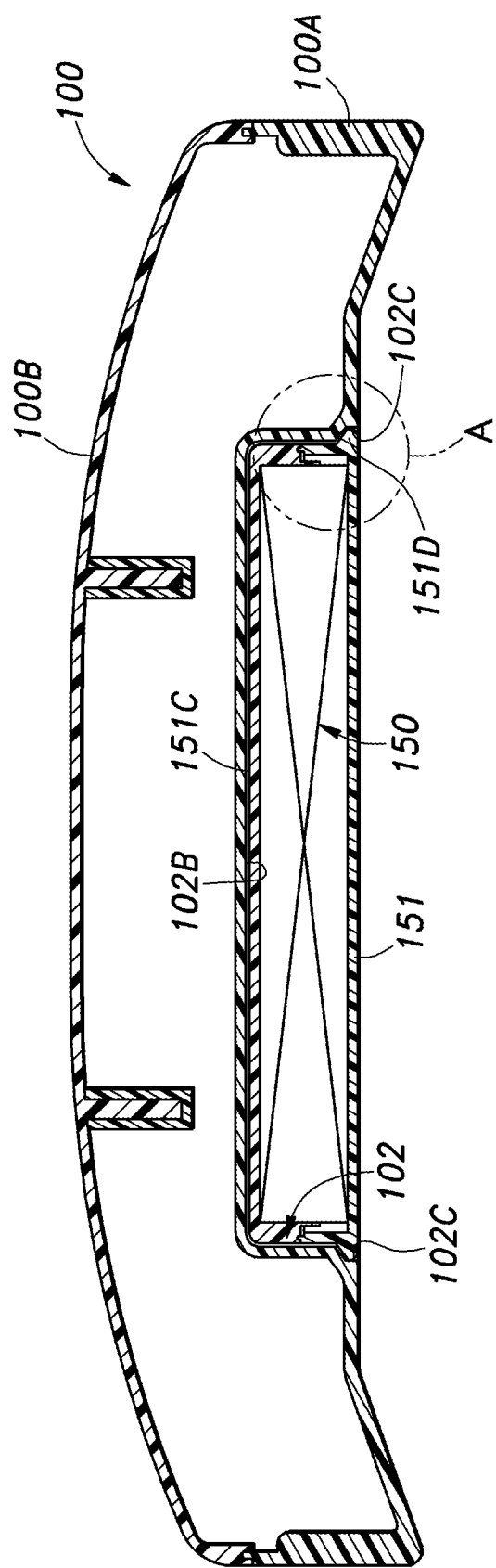
FIG. 8 is a sectional view taken along line VIII-VIII of FIG. 6 to show a second embodiment of the present invention with internal components omitted from illustration.
Figure 9:
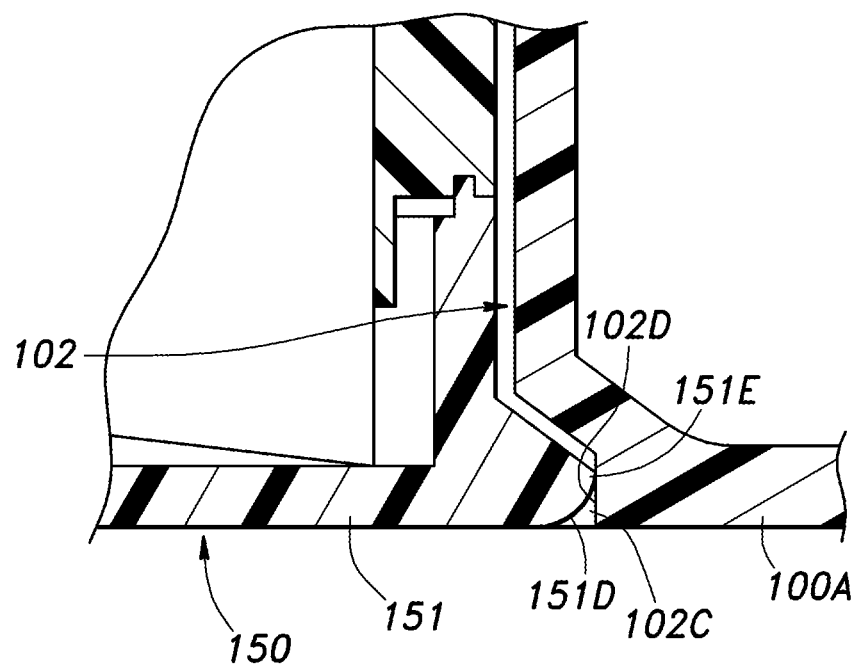
FIG. 9 is an enlarged fragmentary sectional view of a part of FIG. 8 indicated by A.
Figure 10:
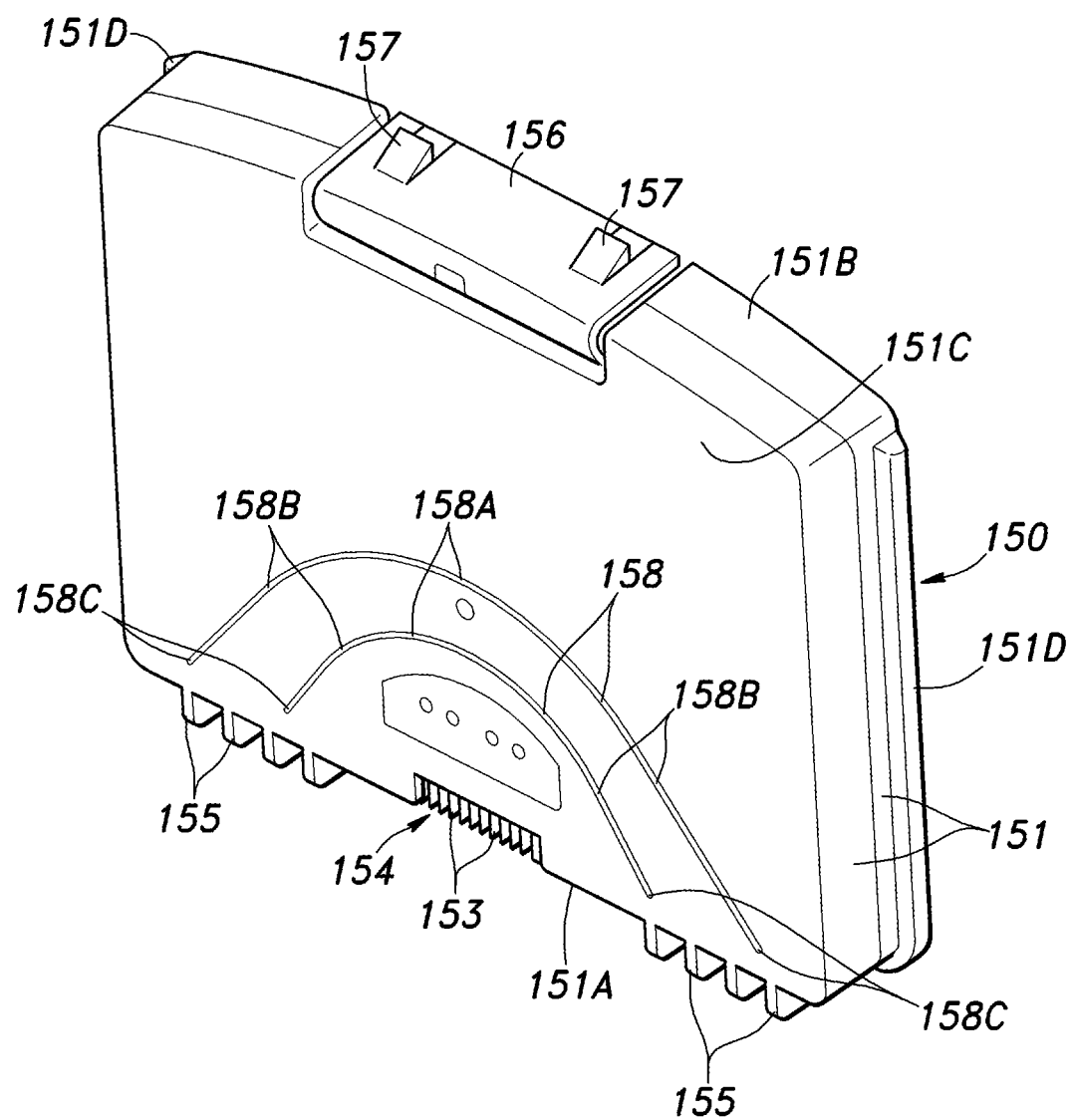
FIG. 10 is a perspective view of the battery pack encasing structure of the second embodiment of the present invention.

FIGS. 8 and 9 show a second embodiment of the present invention. In the following description of the second embodiment, the parts corresponding to those of the first embodiment are denoted with like numerals without repeating the description of such parts. The front face of the battery pack 150 (on the open end of the battery pack receiving recess 102) is provided with a flange 151D extending along the two lateral sides and lower side thereof. The corresponding side edge of the unit casing 100 adjoining the battery pack receiving recess 102 is formed with a recess 102C configured to closely receive the flange 151D of the battery pack 150. As shown in FIG. 9, the recess 102C is defined by a perpendicular surface 102D formed at the open end of the battery pack receiving recess 102 and extending in parallel to the side wall surface of the battery pack receiving recess 102 (or perpendicular to the front face of the battery pack 15) and a slanted shoulder surface connecting the side wall surface of the battery pack receiving recess 102 with the perpendicular surface and extending at an angle with respect to the front face of the battery pack 150.

Because the flange 151D is received in the recess 102C, the interior (or the gap between the side wall of the battery pack 150 and the opposing side wall of the battery pack receiving recess 102 communicates with the exterior via a tortuous passage, and the intrusion of moisture into the battery pack receiving recess 102 can be minimized. In this case, the narrowest part of the passage is defined between the lateral edge 151E of the flange 151D and the perpendicular surface 102D of the recess 102C.

The flange 151D is provided along the outer periphery of the battery pack 150 except for the upper side thereof in the illustrated embodiment, but may also be provided in a smaller or greater part thereof. For instance, the flange may be provided only along the lateral sides thereof or may be provided along the substantially entire periphery thereof.

Figure 11:
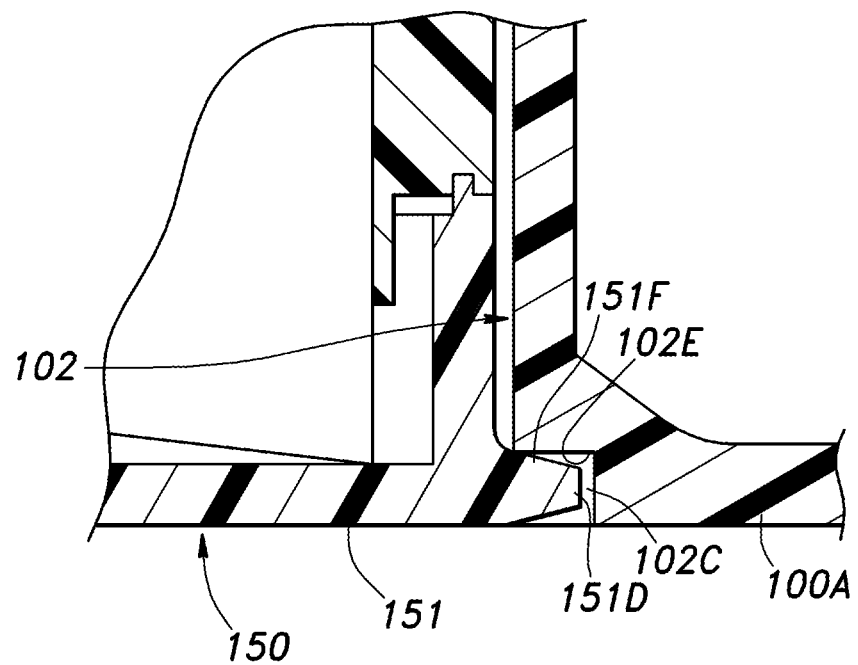
FIG. 11 is a view similar to FIG. 9 showing a modification of the second embodiment of the present invention.

FIG. 11 shows a modification of the second embodiment of the present invention. In this case, the recess 102C is defined by a perpendicular surface formed at the open end of the battery pack receiving recess 102 and extending in parallel to the side wall surface of the battery pack receiving recess 102 (or perpendicular to the front face of the battery pack 15), and a perpendicular shoulder surface 102E connecting the side wall surface of the battery pack receiving recess 102 with the perpendicular surface, and extending in parallel with the front face of the battery pack 150.

In this case also, because the flange 151D is received in the recess 102C, the interior (or the gap between the side wall of the battery pack 150 and the opposing side wall of the battery pack receiving recess 102 communicates with the exterior via a tortuous passage, and the intrusion of moisture into the battery pack receiving recess 102 can be minimized. In this case, the narrowest part of the passage is defined between the rear side 151F of the flange 151D and the shoulder surface 102E (or the inner edge thereof) of the recess 102C.

Although the present invention has been described in terms of preferred embodiments thereof, it is obvious to a person skilled in the art that various alterations and modifications are possible without departing from the scope of the present invention which is set forth in the appended claims. In particular, the various components included in the walking assistance device described above are not necessarily indispensable for the implementation of the present invention, and can be partly omitted and/or substituted without departing from the spirit of the present invention.

The water channels for guiding the moisture to the through holes 149 were defined by the grooves 143 formed on the bottom wall 102B of the battery pack receiving recess 102 and the ridges 158 formed on the opposing surface of the battery pack 150 in the illustrated embodiments, but may also be defined by forming grooves on the battery pack 150 and corresponding ridges on the bottom wall 102B of the battery pack receiving recess 102. Also, the cross sectional shape of the grooves is not limited to a semi-circle, but may also be triangle, rectangle and so forth. The plan view shape of the ridges 158 is not limited to the arch shape but may also be triangular or other shape as long as the moisture can be deflected from the electric connectors and diverted to the through holes. If desired, the plan view shape of the ridges 158 may also consist of a simple slope so that the moisture may be collected into one of the through holes. In that case, the other through hole may be omitted. According to a broad concept of the present invention, only one of the upright walls of the battery pack and the bottom wall of the battery pack receiving recess 102 may be formed with a groove or a ridge which is slanted in such a manner that the moisture that may be deposited on one of the upright walls may be guided to the through hole or through holes.

The contents of the original Japanese patent applications on which the Paris Convention priority claim is made for the present application as well as those of references mentioned in this application are incorporated in this application by reference.

The invention claimed is:

1. A battery pack encasing structure, including:
    a battery pack having a second part of an electric connector provided in an end part of the battery pack; and
    a casing defining a battery pack receiving recess configured to receive the battery pack therein and having a first part of the electric connector provided in an end part of the battery pack receiving recess corresponding to the end part of the battery pack, the battery pack receiving recess having a bottom wall opposing a rear wall of the battery pack when the battery pack is received in the battery pack receiving recess, wherein the bottom wall of the battery pack receiving recess and the rear wall of the battery pack extend substantially vertically such that the electric connector is positioned in a lower part of the battery pack encasing structure when the battery pack encasing structure is in a use position; wherein
    a drain hole is provided in the end part of the casing at a position laterally offset from the first part of the electric connector;
    a ridge is formed on one of the bottom wall of the battery pack receiving recess and the rear wall of the battery pack;
    a groove is formed on the other of the bottom wall of the battery pack receiving recess and the rear wall of the battery pack and complementary to the ridge when the battery pack is received in the battery pack receiving recess; and
    the ridge and the groove each include a part that extends, when the battery pack encasing structure is in the use position, from an elevated position above the electric connector obliquely downward to a position above the drain hole to guide moisture formed between the bottom wall of the battery pack receiving recess and the rear wall of the battery pack to the drain hole.

2. The battery pack encasing structure according to claim 1, wherein each of the ridge and the groove includes an elevated part at the elevated position and a pair of sloping parts on either lateral side of the elevated part so as to extend to corresponding lower parts such that the ridge and groove are given with an arch shape including the elevated part and the pair of sloping parts, a pair of drain holes being provided in the end part of the battery pack receiving recess located under the respective lower end parts of the ridge or groove formed on the bottom wall of the battery pack receiving recess.

3. The battery pack encasing structure according to claim 1, wherein a projection is provided in the end part of the battery pack, the projection being configured to be received in the drain hole without entirely closing the drain hole when the battery pack is received in the battery pack receiving recess.

4. The battery pack encasing structure according to claim 1, wherein the battery pack receiving recess includes an open end opposite from the bottom wall, and wherein a cover plate is provided that selectively closes the open end of the battery pack receiving recess.

5. The battery pack encasing structure according to claim 4, wherein at least a part of a periphery of a wall surface of the battery pack adjacent to the open end of the battery pack receiving recess, when the battery pack is received in the battery pack receiving recess, is provided with a lateral flange, and a part of the casing defining the open end of the battery pack receiving recess includes a recess configured to receive the lateral flange of the battery pack.

6. A walking assistance device, comprising:
    a pelvic frame having an intermediate portion configured to be applied to a lower back of a user and a pair of front portions extending laterally outward and forward from the intermediate portion;
    an abdominal belt detachably securing the pelvic frame on a pelvic part of the user;
    a power generator attached to each front portion of the pelvic frame at a position corresponding to a hip joint of the user; and
    a femoral support member having a base end connected to an output end of each power generator and a free end engaging a femoral pat of the user;
    wherein the battery pack encasing structure according to claim 1 is incorporated on a front side of the intermediate portion of the pelvic frame.

* * * * *

UNITED STATES PATENT AND TRADEMARK OFFICE
CERTIFICATE OF CORRECTION

PATENT NO. : 9,224,993 B2
APPLICATION NO. : 13/488898
DATED : December 29, 2015
INVENTOR(S) : Kazushi Hamaya et al.

It is certified that error appears in the above-identified patent and that said Letters Patent is hereby corrected as shown below:

Title Page

Item (73) Assignee:

Insert --SANYO ELECTRIC CO., LTD., Moriguchi-shi, Osaka (JP)--

Signed and Sealed this
Fifth Day of July, 2016

Michelle K. Lee
*Director of the United States Patent and Trademark Office*